Figure 1:
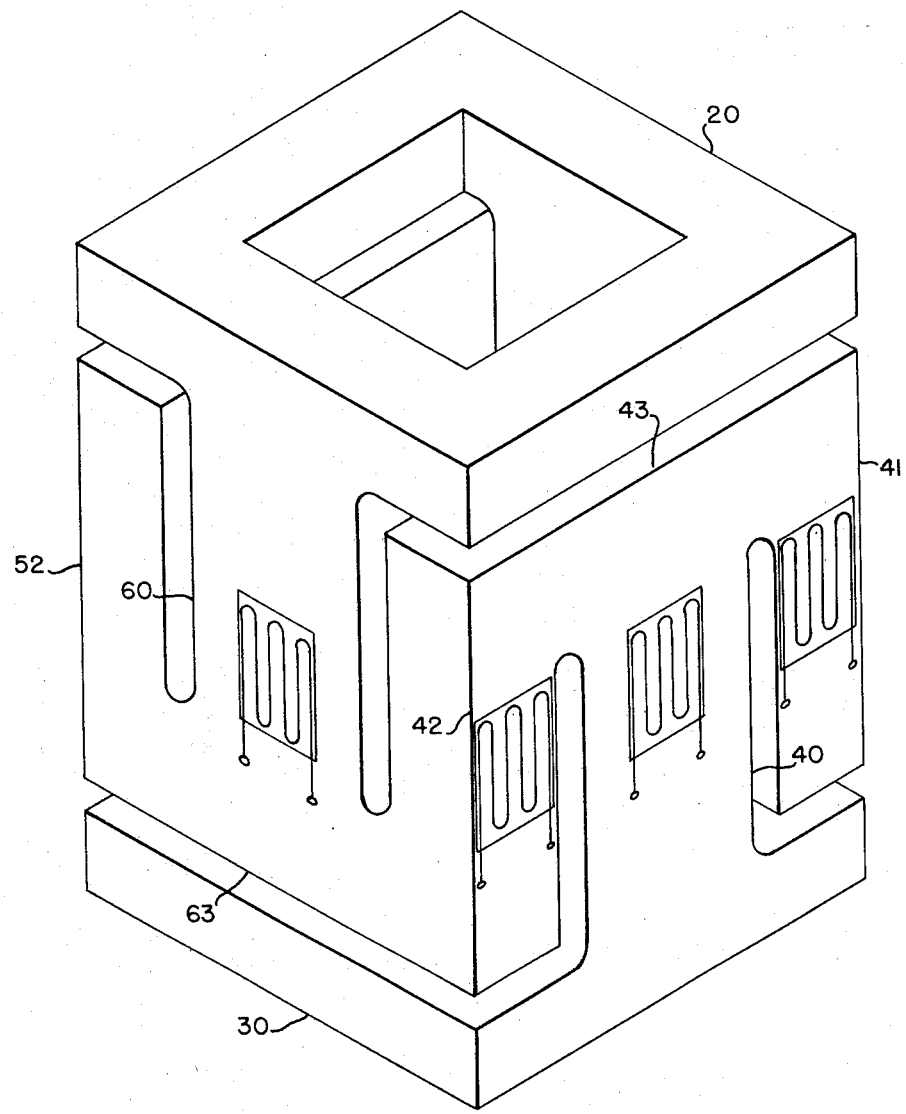

July 9, 1963  A. E. SEED  3,096,644
LOAD CELLS

Filed July 28, 1959  2 Sheets-Sheet 1

INVENTOR.
ANIESE E. SEED
BY
Marshall, Marshall & Yeasting
ATTORNEYS

July 9, 1963  A. E. SEED  3,096,644
LOAD CELLS
Filed July 28, 1959  2 Sheets-Sheet 2
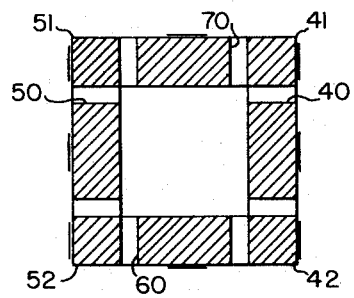
Fig-II
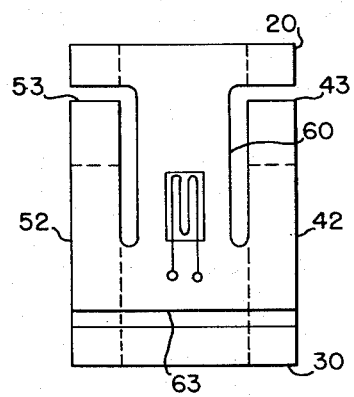
Fig-III
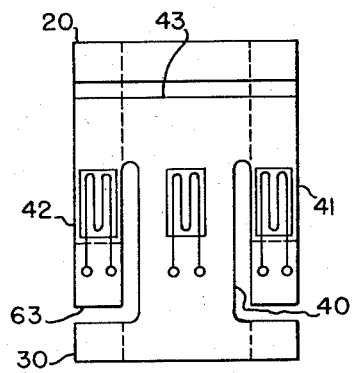
Fig-IV
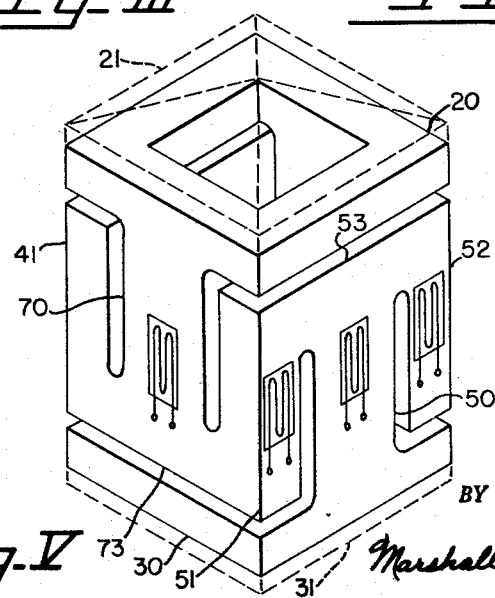
Fig-V
INVENTOR.
ANIESE E. SEED
BY
Marshall, Marshall + Yeasting
ATTORNEYS fa# United States Patent Office 3,096,644
Patented July 9, 1963

3,096,644
LOAD CELLS
Aniese E. Seed, Toledo, Ohio, assignor to Toledo Scale Corporation, Toledo, Ohio, a corporation of Ohio
Filed July 28, 1959, Ser. No. 829,996
9 Claims. (Cl. 73—141)

This invention relates generally to load weighing devices and in particular to load cells of the type which are utilized in conjunction with various strain gage devices to determine the magnitude of a load applied to the load cell.

Load cells are utilized in many different fields where load forces are to be measured or masses are to be weighed. Load cells in conjunction with strain gage devices find particular application in permanent installations in which the load cells are so located that it is impossible or very difficult to provide maintenance for the load weighing devices.

In most applications it is impossible to center a load directly over one load cell so that a plurality of the load cells must be used to support and measure a particular load. An outstanding example of this is a load weighing device for trucks. If it is impossible to center the load over one load cell then the off-center loading or torque loading of a load cell and how it reacts thereto is very important.

In still other applications load cells are used to measure loads which transmit rotational torque to the load cell. For example, the screw-down screw of a rolling mill applies a rotational torque to the measuring load cell, creating torque strains within the cell in the load sensitive area.

The physical size of a load cell is important in that a standard line of load cells of a particular geometry may perform well at one size while another size responds inefficiently to an applied load.

Accordingly, it is an object of this invention to provide an improved load cell which is efficient at all sizes, the cost of which is small, which effectively resists undesired rotational torque forces, and which balances off-center loading.

It is a further object of this invention to provide a load cell device which may be formed from one piece of stock, providing a low mechanical hysteresis, which has mounting surfaces for strain gage devices on which the stress is uniform, and has mounting surfaces from which both positive and negatives stresses may be obtained.

In accordance with the above objects it is a feature of this invention to provide a force measuring device comprising upper and base end members. An opposed pair of primary intermediate columns project upward from said base member. Each of said primary intermediate columns are split and turned back on themselves to form a pair of corner columns. One downward extending corner column of each of said primary intermediate columns merges with a corresponding corner column from the other primary intermediate column to form a secondary intermediate column which extends upward to said upper end member.

Alternatively, the force measuring device embodying the features of this invention may be described as comprising four corner columns and four intermediate columns plus four coupling bridges. Two of the bridges couple each of the upper extremities of a first pair of opposed intermediate columns to two adjacent corner columns. The remaining two bridges couple each of the lower extremities of a second pair of opposed intermediate columns to two adjacent corner columns.

Each of the cross sectional areas of the intermediate columns of the force measuring device are advantageously twice the cross sectional areas of each of the corner columns. Mounting surfaces for a load responsive device are provided on each of the intermediate and corner columns. Load forces are applied to the load cell or force measuring device preferably at the center of the upper and base end members through load receiving members covering said upper and base end members, according to the first description, and to the ends of each of said pairs of the intermediate columns opposite the end to which their respective coupling bridges are attached in the alternate description.

Other objects and advantages will become apparent to those skilled in the art from the following description when taken in conjunction with the accompanying drawings in which:

FIG. I is a view in perspective of a load cell embodying the teachings of this invention;
FIG. II is a cross section of a plan view of FIG. I;
FIG. III is a front view of FIG. II;
FIG. IV is a side view of FIG. III; and
FG. V is a perspective view from the rear of FIG. I.

Referring to FIGS. I through V there is shown a load cell comprising an upper end member 20 and a base end member 30. An opposed pair of primary intermediate columns 40 and 50 project upwardly from the base member 30. Each of the primary intermediate columns 40 and 50 are split and turned back upon themselves to form pairs of corner columns 41, 42 and 51, 52, respectively. One downwardly extending corner column 42 merges with a corresponding corner column 52 from the other primary intermediate column 50 to form a secondary column 60 which extends upward to the upper end member 20. The other downward extending corner column 41 merges with its corresponding corner column 51 from the primary intermediate column 50 to form a secondary intermediate column 70 which opposes the secondary intermediate column 60 and extends upward to the upper end member 20. Each of the intermediate columns 40, 50, 60 and 70 are twice the cross sectional area of each of the corner columns 41, 42, 51 and 52.

The upper end and base end members 20 and 30 receive the load forces for the force measuring device shown in the drawings preferably through force receiving means shown in phantom outline at 21 and 31 of FIG. V which centers the load at the center of the rectangular prism formed by the intermediate and corner columns. A mounting surface for a load responsive device may be provided as shown on each of the intermediate and corner columns.

As may be most clearly seen in FIGS. III and IV the force measuring device of this invention may be formed or machined from an integral piece of stock thus reducing undesirable mechanical hysteresis effects. It is to be noted however that the force measuring device of this invention could be formed by welding or otherwise attaching together the parts of the force measuring device as herein described. For example, the force measuring device shown in the drawings may be considered as comprising four corner columns 41, 42, 51 and 52 and four intermediate columns 40, 50, 60 and 70 plus four coupling bridges, of which 43 and 63 are shown in FIGS. I, III and IV. Coupling bridges 53 and 73 are shown in FIG. V. Two of the coupling bridges 43 and an opposed coupling bridge 53, couple each of the upper extremities of a first pair of opposed intermediate columns 40 and 50 to two adjacent corner columns 41, 42 and 51, 52. The two remaining coupling bridges 63 and its opposed corresponding bridge 73 couple each of the lower extremities of the second pair of opposed intermediate columns 60 and 70 to two adjacent corner columns 42, 52 and 41, 51, respectively. In this second description of the load cell the load forces for the force measuring device are applied to the ends of each of said pairs of intermediate columns opposite the end to which their respective coupling bridges are attached. That is, one load force is applied to the columns 40 and 50 at the ends opposite the coupling bridges 43 and 53, while the other load force is applied to the columns 60 and 70 at the ends opposite the coupling bridges 63 and 73. Means for applying the load forces are the upper and base end members 20 and 30 to the respective pairs of opposed intermediate columns.

Thus there is disclosed a spring unit or force measuring device which is a multiple column device composed of eight columns and integral square end frames. A compression load applied to the end frames imposes equal tensile stresses on the four corner columns and equal compressive stresses of the same absolute magnitude on the four columns intermediate the four columns. The several columns are reversed on themselves as described hereinbefore by splitting or by means of the coupling bridges to obtain this result. The intermediate columns are twice the cross sectional area of the corner columns to insure that the total area of those portions under compression is equal to the total area of those portions under tension.

A strain gage may be bonded or otherwise attached to the outer face of each column in the region between the coupling bridges. Therefore the unit accommodates eight gages for compression and for tension measurements.

The geometrical configuration of this load cell may be obtained from the machining of a single piece of stock and therefore has little mechanical hysteresis. The load cell offers linear spring characteristics, may be made in a small physical size, has little response to torque loading, has mounting surfaces for strain gages having the maximum stress in the unit, has a uniform stress across the mounting surface of an adequate area, and has equal numbers of mounting areas for both compressive and tensile stresses.

In conclusion, it is pointed out that while the illustrative example constitutes a practical embodiment of my invention, I do not limit myself to the exact details shown since modification of the same may be made without departing from the spirit and scope of this invention.

Having described the invention, I claim:

1. Force measuring apparatus comprising a unitary device which may be conveniently formed from a single piece of stock and which has an equal number of oppositely stressed mounting surfaces for strain gage devices and which includes upper and base end elements adapted to receive forces to be measured, an opposed pair of primary intermediate column elements projecting upward from said base element, each of said primary intermediate column elements being split at its upper extremity and turned back on itself to form a pair of downwardly projecting corner column elements, each downwardly projecting corner column element merging at its lowermost extremity with a corresponding corner column element from the opposite primary intermediate column element to form a secondary intermediate column element which extends upwardly to said upper end element, said intermediate column elements being stressed in tension or compression when said corner column elements are stressed respectively in compression or tension in response to an applied load force.

2. Force measuring apparatus comprising a unitary device which may be conveniently formed from a single piece of stock and which has an equal number of oppositely stressed mounting surfaces for strain gage devices and which includes upper and base end elements adapted to receive forces to be measured, an opposed pair of primary intermediate column elements projecting upward from said base element, each of said primary intermediate column elements being split at its upper extremity and turned back on itself to form a pair of downwardly projecting corner column elements, each downwardly projecting corner column element merging at its lowermost extremity with a corresponding corner column element from the opposite primary intermediate column element to form a secondary intermediate column element which extends upwardly to said upper end element, said intermediate column elements being stressed in tension or compression when said corner column elements are stressed respectively in compression or tension in response to an applied load force, each of said intermediate column elements having twice the cross sectional area of each of said corner column elements.

3. Force measuring apparatus comprising a unitary device which may be conveniently formed from a single piece of stock and which has an equal number of oppositely stressed mounting surfaces for strain gage devices and which includes upper and base end elements adapted to receive forces to be measured, an opposed pair of primary intermediate column elements projecting upward from said base element, each of said primary intermediate column elements being split at its upper extremity and turned back on itself to form a pair of downwardly projecting corner column elements, each downwardly projecting corner column element merging at its lowermost extremity with a corresponding corner column element from the opposite primary intermediate column element to form a secondary intermediate column element which extends upwardly to said upper end element, said intermediate column elements being stressed in tension or compression when said corner column elements are stressed respectively in compression or tension in response to an applied load force, mounting surfaces for said strain gage devices being provided on the accessible exterior surface of each of said intermediate and corner column elements.

4. Force measuring apparatus comprising a unitary device which may be conveniently formed from a single piece of stock and which has an equal number of oppositely stressed mounting surfaces for strain gage devices and which includes upper and base end elements adapted to receive forces to be measured, an opposed pair of primary intermediate column elements projecting upward from said base element, each of said primary intermediate column elements being split at its upper extremity and turned back on itself to form a pair of downwardly projecting corner column elements, each downwardly projecting corner column element merging at its lowermost extremity with a corresponding corner column element from the opposite primary intermediate column element to form a secondary intermediate column element which extends upwardly to said upper end element, said intermediate column elements being stressed in tension or compression when said corner column elements are stressed respectively in compression or tension in response to an applied load force, each of said intermediate column elements having twice the cross sectional area of each of said corner column elements, mounting surfaces for said strain gage devices being provided on the accessible exterior surface of each of said intermediate and corner column elements.

5. Force measuring apparatus comprising a unitary device which may be conveniently formed from a single piece of stock and which has an equal number of oppositely stressed mounting surfaces for strain gage devices and which includes upper and base end frames adapted to receive forces to be measured, an opposed pair of primary intermediate column elements projecting upward from said base frame, each of said primary intermediate column elements being split at its upper extremity and turned back on itself to form a pair of downwardly projecting corner column elements, each downwardly projecting corner column element merging at its lowermost extremity with a corresponding corner column element from the opposite primary intermediate column element to form a secondary intermediate column element which extends upwardly to said upper end frame, said intermediate column elements being stressed in tension or compression when said corner column elements are stressed respectively in compression or tension in response to an applied load force, each of said upper and base end frames being square and disposed with respect to each other and said columns to define a space saving rectangular prism.

6. Force measuring apparatus comprising a unitary device which may be conveniently formed from a single piece of stock and which has an equal number of oppositely stressed mounting surfaces for strain gage devices and which includes four corner column elements, two pairs of opposed column elements intermediate said corner column elements, four coupling bridge elements, two of said bridge elements respectively coupling each of the upper extremities of one pair of opposed intermediate column elements to the upper extremities of two adjacent corner column elements, the remaining two bridge elements respectively coupling each of the lower extremities of the other pair of opposed intermediate column elements to the lower extremities of two adjacent corner column elements, and means for applying opposing load forces to said device at the free ends of each pair of said two pair of opposed intermediate column elements, said intermediate column elements being stressed in tension or compression when said corner column elements are stressed respectively in compression or tension in response to application of a load.

7. Force measuring apparatus comprising a unitary device which may be conveniently formed from a single piece of stock and which has an equal number of oppositely stressed mounting surfaces for strain gage devices and which includes four corner column elements, two pairs of opposed column elements intermediate said corner column elements, four coupling bridge elements, two of said bridge elements respectively coupling each of the upper extremities of one pair of opposed intermediate column elements to the upper extremities of two adjacent corner column elements, the remaining two bridge elements respectively coupling each of the lower extremities of the other pair of opposed intermediate column elements to the lower extremities of two adjacent corner column elements, and means for applying opposing load forces to said device at the free ends of each pair of said two pair of opposed intermediate column elements, said intermediate column elements being stressed in tension or compression when said corner column elements are stressed respectively in compression or tension in response to application of a load, each of said intermediate column elements having twice the cross sectional area of each of said corner column elements.

8. Force measuring apparatus comprising a unitary device which may be conveniently formed from a single piece of stock and which has an equal number of oppositely stressed mounting surfaces for strain gage device and which includes four corner column elements, two pairs of opposed column elements intermediate said corner column elements, four coupling bridge elements, two of said bridge elements respectively coupling each of the upper extremities of one pair of opposed intermediate column elements to the upper extremities of two adjacent corner column elements, the remaining two bridge elements respectively coupling each of the lower extremities of the other pair of opposed intermediate column elements to the lower extremities of two adjacent corner column elements, and means for applying opposing load forces to said device at the free ends of each pair of said two pair of opposed intermediate column elements, said intermediate column elements being stressed in tension or compression when said corner column elements are stressed respectively in compression or tension in response to application of a load, mounting surfaces for said strain gage devices being provided on the accessible exterior surface of each of said column elements.

9. Force measuring apparatus comprising a unitary device which may be conveniently formed from a single piece of stock and which has an equal number of oppositely stressed mounting surfaces for strain gage devices and which includes four corner column elements, two pairs of opposed column elements intermediate said corner column elements, four coupling bridge elements, two of said bridge elements respectively coupling each of the upper extremities of one pair of opposed intermediate column elements to the upper extremities of two adjacent corner column elements, the remaining two bridge elements respectively coupling each of the lower extremities of the other pair of opposed intermediate column elements to the lower extremities of two adjacent corner column elements, and means for applying opposing load forces to said device at the free ends of each pair of said two pair of opposed intermediate column elements, said intermediate column elements being stressed in tension or compression when said corner column elements are stressed respectively in compression or tension in response to application of a load, said load applying means comprising upper and lower end frames integral with the upper and lower extremities of said other pair and said one pair, respectively, of said two pairs of opposed intermediate column elements.

References Cited in the file of this patent

UNITED STATES PATENTS

| | | |
|---|---|---|
| 2,796,503 | Ward | June 18, 1957 |
| 2,814,946 | Harris | Dec. 3, 1957 |
| 2,859,613 | Green | Nov. 11, 1958 |